Feb. 19, 1929.

J. HEBERLING

CHILD'S VEHICLE

Filed Feb. 9, 1923

1,702,691

INVENTOR.
John Heberling
BY Davis & Simms
his ATTORNEYS.

Patented Feb. 19, 1929.

1,702,691

UNITED STATES PATENT OFFICE.

JOHN HEBERLING, OF ROCHESTER, NEW YORK.

CHILD'S VEHICLE.

Application filed February 9, 1923. Serial No. 617,953.

The present invention relates to children's vehicles and more particularly to the type in which the vehicle embodies a body portion with a pair of rear wheels, a pair of steerable front wheels, and a tongue connected to the front wheels to steer the vehicle. An object of this invention is to combine with a vehicle of the type mentioned a step which will permit the utilization of the entire body of the vehicle and which will be so arranged that a child standing thereon with one foot may propel the vehicle and at the same time steer the latter through the tongue. Another object of the invention is to provide a step designed for the purpose above set forth which, when not in use, may be compactly folded on the body. Still another object of the invention is to provide a step for the purpose above set forth which will be strong and durable in use and inexpensive to manufacture.

To these and other ends, the invention consists of certain parts and combinations of parts, all of which will be hereinafter described: the novel features being pointed out in the appended claims.

Figure 1:
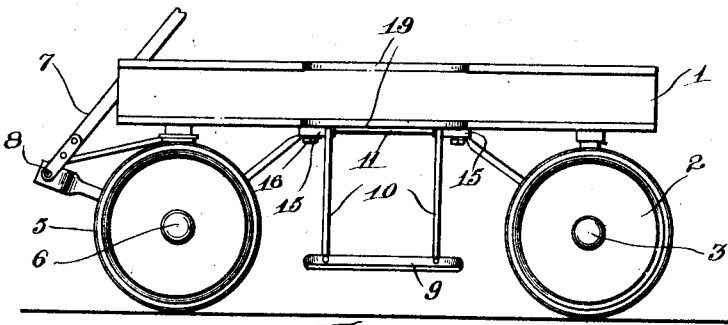
Fig. 1 is a side view of the vehicle constructed in accordance with this invention, the step being shown in lowered position.
Figure 2:
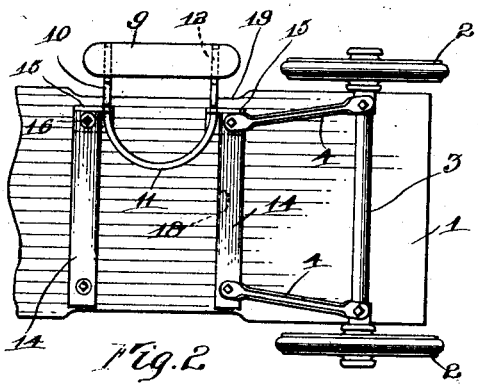
Fig. 2 is a fragmentary bottom view of the step in lowered position.

Referring to the embodiment of the invention herein illustrated, 1 indicates the body of the vehicle, 2 the rear wheels supported by an axle 3 which through a framework 4 is secured to the underside of the body 1. At the front of the vehicle are steerable wheels 5 secured to an axle 6 which is mounted to swing in any known manner so that the vehicle may be steered, the axle having a tongue 7 pivoted therethrough at 8 so that said tongue may swing upwardly to extend rearwardly over the body of the vehicle. This arrangement permits the child to steer the vehicle from the body while the vehicle is being pushed or otherwise propelled from the rear, or during coasting. This form of wagon or vehicle is the common form now employed by small children.

Combined with this wagon is a step 9 which preferably is situated to one side of the vehicle body between front and rear wheels 2 and 4 at said side, the position of this step being such that a child may stand thereon with one foot and with the other foot propel the vehicle, at the same time grasping the tongue 7 in the hands to steer and steady the vehicle. It is preferred to cut the beading or flanges at the side of the vehicle body away to provide a recess, as shown at 19, so that the leg of the child may rest comfortably against the side of the vehicle while the foot is on the step, and at the same time permitting the weight of the child to be brought nearer to the center of gravity of the vehicle without destroying the capacity of the body. A preferred means of mounting the step 9 is to employ one or more, preferably two, suspending arms 10 which have a sliding and pivotal connection with the vehicle body. In this instance, an abutment 11 connects the arms at one end, while the other ends of the arms are provided with laterally turned portions 12 which pass through transverse bores in the step 9. An abutting portion 11 connects with the arms 10 by bends 13, the abutting portion, the arms 10 and the laterally turned portions 13, in this instance, being formed from metallic rod bent to provide such portions.

Figure 3:
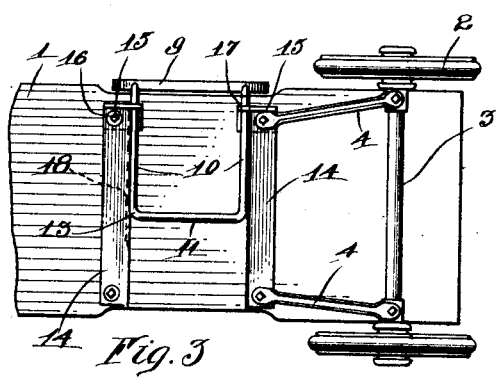
Fig. 3 is a fragmentary bottom view of the step folded upon the body in the position of non-use.
Figure 4:
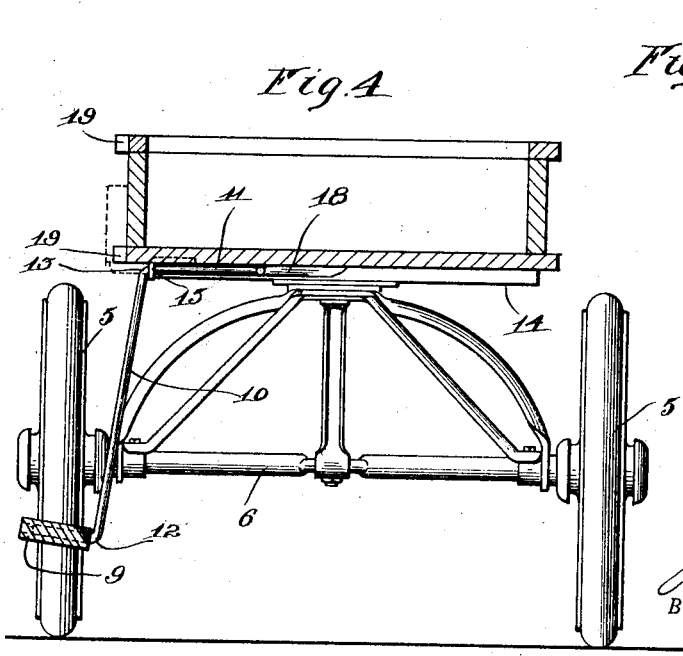
Fig. 4 is an enlarged vertical section through the vehicle showing the step in position for use.
Figure 5:
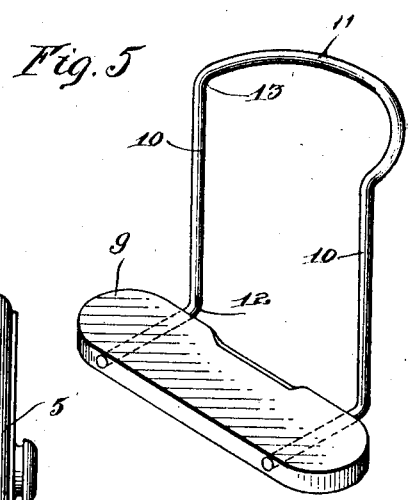
Fig. 5 is a perspective view of the step.

In order that the pivotal and sliding connection may be provided, the under side of the body is provided with two transverse cleats 14 which at the side adjacent the steps have two angle members 15 secured thereto, preferably by bolts 16 passing through the cleats in the body and also through one of the flanges of each of the angle members, the other flanges abutting the ends of the cleats and extending inwardly, being provided with openings 17 through which the arms 10 work. The opposed edges of the cleats are undercut or grooves at 18 so that the cleats provide guides in which the arms 10 may travel when the step is moved from the position of use to the collapsed position or vice versa. When the step is in operative position, the abutment 11 engages the opposite side of the bottom of the body between the cleats in the manner shown in Fig. 6, while the arms 10 depend therefrom and the curved portions 13 lie in the openings of the angle members 15. To fold or collapse the step, the latter is swung outwardly on the curved portions 13 as pivots until the arms 10 are parallel with the under side of the bottom of the vehicle 1, after which the step may be shoved inwardly so that it lies in parallel relation with the adjacent side of the body 1, as shown in Fig. 3. The movement of the step to position of use is effected by sliding the step outwardly till the movable portions 13 are reached when the step is released and drops by gravity to the desired position.

This construction makes it possible to construct a child's wagon in the usual manner, without destroying the outline of the body. The step, when not in use, is folded into such a relation to the body that it is inconspicuous. The child, when using the step, may fill the body with any suitable contents without any interference with such use. The construction is strong, durable and inexpensive to manufacture. The child in using the step throws the usual draft handle backwardly to extend over the body of the vehicle in order that the latter may be employed to steer the vehicle. With one foot resting on the step, the other foot is brought intermittently into engagement with the ground to push the vehicle forwardly.

What I claim as my invention and desire to secure by Letters Patent is:

1. The combination with a child's vehicle comprising a body, a pair of rear wheels, a pair of steerable front wheels, and a draft tongue movably connected to the front wheels, of a step, and means for suspending the step at one side of the body between the front and the rear wheel on said side, said suspending means embodying two arms rigidly connected to the step and pivotally and slidably connected to the body, and an abutment connecting the upper ends of the arms and adapted to cooperate with the under side of the body to sustain the step in operative position.

2. The combination with a child's vehicle comprising a body, a pair of rear wheels, a pair of steerable front wheels, and a draft tongue movably connected to the front wheels, of a step, and means for suspending the step at one side of the body between the front and the rear wheel, comprising a pair of cleats on the under side of the body, angle plates secured at the ends of the cleats and provided with openings, two arms rigidly connected to the step and mounted to slide and swing in said openings, and an abutment connecting the upper ends of the arms and adapted to cooperate with the under side of the body between the cleats when the step is in operative position.

3. The combination with a child's vehicle comprising a box-like body, a pair of rear wheels, a pair of steerable front wheels, and a draft tongue movably connected with the front wheels, of a step, and suspending means for the step to cause the latter to lie at one side of the body between the front and rear wheel on said side, said suspending means embodying a pair of cleats secured to and transversely of the body on the under side thereof, and having grooves in their opposed edges, two arms connected to the step, an abutment connecting the arms, and means through which the arms are adapted to move in order to slide in the grooves of the cleats and to swing to carry the abutment into and out of engagement with the under surface of the body.

JOHN HEBERLING.